US011006171B1

(12) United States Patent
Chen et al.

(10) Patent No.: US 11,006,171 B1
(45) Date of Patent: May 11, 2021

(54) SELECTING AN OPTIMAL FORMAT FOR PRESENTING A GROUP OF OBJECTS ASSOCIATED WITH A THIRD-PARTY SYSTEM IN A GRAPHICAL USER INTERFACE

(71) Applicant: Facebook, Inc., Menlo Park, CA (US)

(72) Inventors: Han Chen, London (GB); Suchada Sutasirisap, Redwood City, CA (US); Shiyang Liu, Fremont, CA (US); Erheng Zhong, Fremont, CA (US); Hao Wang, London (GB); Lingyuan Ke, Foster City, CA (US); Danlu Huang, Menlo Park, CA (US); Ken Cheng, Menlo Park, CA (US); Yan Yang, Mountain View, CA (US); Albert Boeing Chen, Menlo Park, CA (US); Shen Wang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 16/258,434

(22) Filed: Jan. 25, 2019

(51) Int. Cl.
| | |
|---|---|
| *G06F 3/00* | (2006.01) |
| *G06F 13/00* | (2006.01) |
| *H04N 5/445* | (2011.01) |
| *H04N 21/431* | (2011.01) |
| *G06F 16/909* | (2019.01) |
| *G06F 16/9035* | (2019.01) |
| *G06F 16/9038* | (2019.01) |

(52) U.S. Cl.
CPC ....... *H04N 21/4314* (2013.01); *G06F 16/909* (2019.01); *G06F 16/9035* (2019.01); *G06F 16/9038* (2019.01); *H04N 21/4316* (2013.01)

(58) Field of Classification Search
CPC ............ H04N 21/4314; H04N 21/4316; G06F 16/909; G06F 16/9038; G06F 16/9035
See application file for complete search history.

(56) References Cited

U.S. PATENT DOCUMENTS

| | | | |
|---|---|---|---|
| 2007/0006099 A1* | 1/2007 | Johnson | G06F 16/9577 715/828 |
| 2015/0058358 A1* | 2/2015 | Xu | G06F 16/335 707/748 |
| 2016/0070449 A1* | 3/2016 | Christiansen | G06F 16/9535 715/765 |
| 2017/0337201 A1* | 11/2017 | Pak | G06F 16/24578 |
| 2019/0108557 A1* | 4/2019 | Jain | G06Q 30/0277 |
| 2019/0188323 A1* | 6/2019 | Ghosh | G06F 16/9535 |

\* cited by examiner

*Primary Examiner* — Kyu Chae
(74) *Attorney, Agent, or Firm* — Fenwick & West LLP

(57) ABSTRACT

An online system receives information describing a collection of objects associated with a third-party system and an objective associated with each object. Upon receiving a request to present content associated with the third-party system to a user of the online system, the online system determines one or more groups in which each object is included based on a condition satisfied by objects included in each group. For each of multiple formats that may be used to present each group of objects, the online system computes a format score indicating a predicted likelihood that the user will perform a set of actions corresponding to a set of objectives associated with the group if the format is used. The online system selects a format for presenting each group of objects based on the format scores and/or a set of format selection rules and generates the user interface using the selected format(s).

18 Claims, 5 Drawing Sheets

SELECTING AN OPTIMAL FORMAT FOR PRESENTING A GROUP OF OBJECTS ASSOCIATED WITH A THIRD-PARTY SYSTEM IN A GRAPHICAL USER INTERFACE

TECHNICAL FIELD

This disclosure relates generally to online systems, and more specifically to selecting an optimal format for presenting a group of objects associated with a third-party system.

BACKGROUND

Content presented to users of online systems may allow the users to access and perform actions associated with objects, in which the objects are associated with third-party systems (e.g., via links to landing pages associated with the third-party systems). These objects may correspond to physical objects (e.g., products), applications (e.g., mobile applications, gaming applications, etc.), services, events, content items, or any other suitable types of objects that may be associated with a third-party system. The objects may be associated with objectives that may be achieved if online system users presented with the objects perform various actions associated with the objects (e.g., maximizing a number of installations of an application). Furthermore, objects may be presented in a user interface using a particular format, such as a grid format, a carousel format, etc.

However, formats used to present objects associated with third-party systems may not maximize the likelihood that online system users presented with the objects will perform actions that will achieve their associated objectives. Some online system users who are presented with objects in a particular format may be more or less likely than other users to perform these actions for various user-specific reasons. For example, objects presented in a particular format may appear differently to different users due to different screen sizes or screen resolutions of client devices being used by the users to view the objects. As an additional example, different online system users may prefer to view objects in one format (e.g., a grid format) while other online system users may prefer to view objects in a different format (e.g., a carousel format or a list format). Additionally, the formats may have characteristics that may make it difficult for some online system users to perform these actions. For example, if objects are presented in an automatically scrollable carousel format, an online system user who is in a hurry may not have the patience to view all of the objects while another user who is not in a hurry may not have enough time to view one or more of the objects.

SUMMARY

Online systems may present content to online system users that allow the users to access and perform various actions associated with objects, in which the objects are associated with third-party systems. However, due to various user-specific reasons, objects associated with third-party systems may not be presented using formats that maximize the likelihood that online system users presented with the objects will perform actions that will achieve their associated objectives. Additionally, formats that may be used to present the objects may have characteristics that may make it difficult for some online system users to perform these actions.

To maximize the likelihood that objectives associated with collections of objects associated with third-party systems are achieved, an online system selects an optimal format for presenting a group of objects associated with a third-party system to a viewing user of the online system. More specifically, the online system receives information describing a collection of objects associated with the third-party system and an objective associated with each object. Upon receiving a request to present content associated with the third-party system to the viewing user, the online system determines one or more groups in which each object is included based on a condition satisfied by objects included in each group. For each of multiple formats that may be used to present each group of objects, the online system computes a format score indicating a predicted likelihood that the viewing user will perform a set of actions corresponding to a set of objectives associated with the group if the format is used. The online system selects a format for presenting each group of objects based on the format scores and/or a set of format selection rules and generates a user interface for presenting the group(s) of objects using the selected format(s). The online system may then send the user interface for display to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
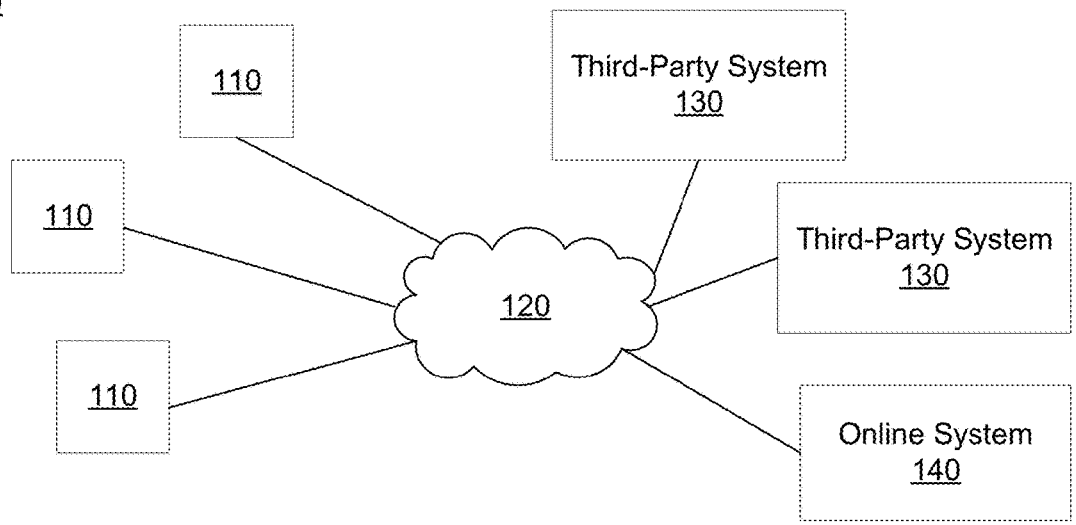
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
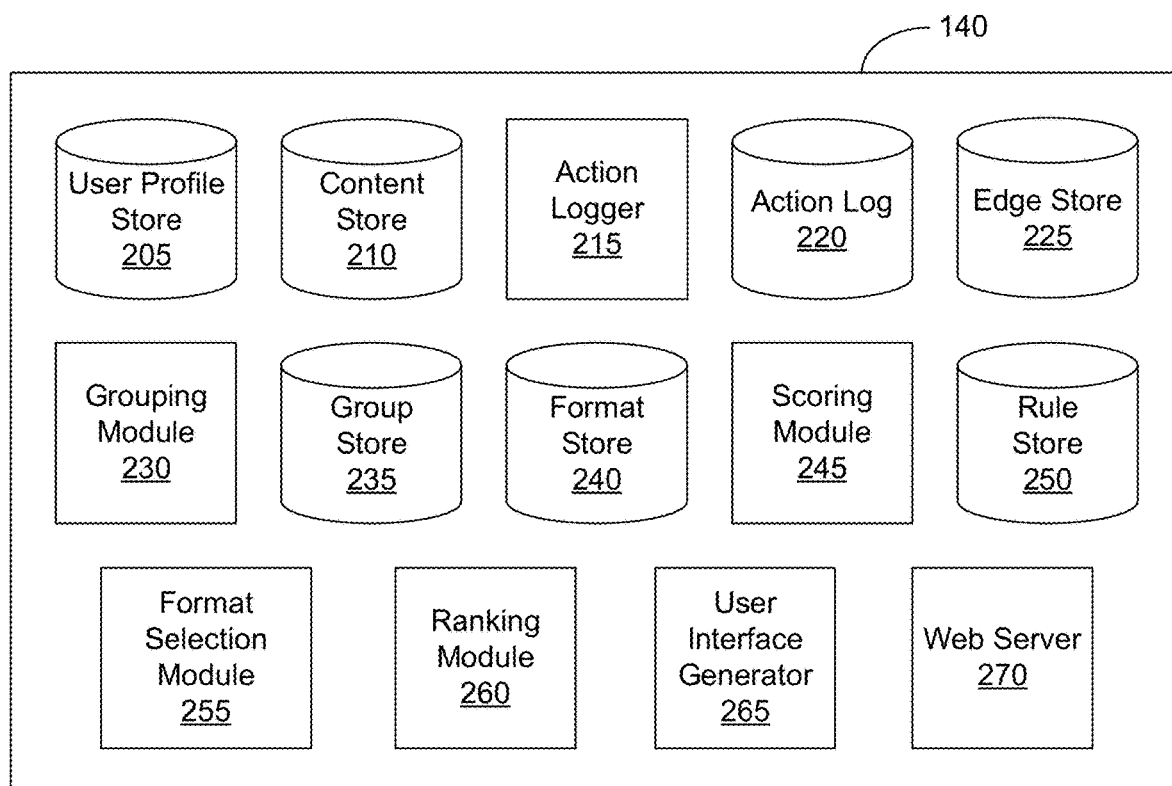
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a grouping module 230, a group store 235, a format store 240, a scoring module 245, a rule store 250, a format selection module 255, a ranking module 260, a user interface generator 265, and a web server 270. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

The user profile store 205 may store user-specific features associated with users of the online system 140. User-specific features associated with online system users may describe client devices 110 associated with the users. For example, a user-specific feature associated with an online system user may describe a screen size of a client device 110 associated with the user. In this example, the user-specific feature also or alternatively may describe the type of client device 110 associated with the user (e.g., a smartphone, a tablet, a desktop computer, a laptop computer, etc.). In various embodiments, user-specific features associated with online system users also may describe format preferences specified by the users that identify formats to be used to present various types of content to the users. For example, a user-specific feature associated with an online system user may indicate a type of format previously specified by the user to be used to present content to the user (e.g., a grid format, a carousel format, a list format, etc.).

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Objects stored in the content store 210 may correspond to various types of objects that may be associated with a third-party system 130, such as physical objects (e.g., products), applications (e.g., gaming applications, mobile applications, etc.), services, events, content items, or any other suitable types of objects. In embodiments in which the objects correspond to content items, the content items may include various types of content associated with a third-party system 130, such as information describing the third-party system 130 (e.g., a map to a physical location associated with the third-party system 130), content associated with the third-party system 130 generated by an online system user (e.g., a review of a product, a service, or other type of object associated with the third-party system 130), a promotion associated with the third-party system 130 (e.g., a coupon), a request to provide information associated with the third-party system 130 (e.g., a request to complete a survey associated with the third-party system 130), a request to receive information associated with the third-party system 130 (e.g., a request to receive a newsletter associated with the third-party system 130), a chat feature associated with the third-party system 130 (e.g., with a chat bot), and editorial content associated with the third-party system 130 (e.g., articles about the third-party system 130).

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In some embodiments, information stored in the action log 220 may describe user actions that satisfy a set of objectives associated with a set of objects, in which the set of objects are associated with one or more third-party systems 130. Examples of objectives that may be associated with an object include maximizing a number of clicks on the object, maximizing a number of conversions associated with the object, or any other suitable types of objectives that may be associated with an object. For example, an objective associated with an object may correspond to maximizing a number of online system users who have joined a group corresponding to the object, maximizing a number of online system users who have registered for an event corresponding to the object, maximizing a number of online system users who have expressed a preference for a content item corresponding to the object, maximizing a number of online system users who have installed an application corresponding to the object, maximizing a number of online system users who have purchased a product corresponding to the object, etc.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The grouping module 230 determines (e.g., as shown in step 315 of FIG. 3) one or more groups in which each object included in a collection of objects associated with a third-party system 130 is included based on a condition satisfied by objects included in each group. Examples of conditions satisfied by groups of objects include being recently viewed by a viewing user of the online system 140, being similar to one or more objects recently viewed by the viewing user, being of interest or likely being of interest to users of the online system 140 connected to the viewing user, being of interest or likely being of interest to the viewing user, being popular on a local level (e.g., among online system users located in the same city, county, state, country, or region), being popular on a global level (e.g., among online system users located across multiple countries), etc. In some embodiments, the grouping module 230 may determine that an object should be included in multiple groups. For example, if an object recently viewed by a viewing user of the online system 140 is also popular among online system users connected to the viewing user, the grouping module 230 may determine that the object should be included in a group of objects that were recently viewed by the viewing user and a group of objects that are popular among online system users connected to the viewing user.

In some embodiments, groups of objects may be associated with different stages within a progression of stages capable of being satisfied by a viewing user of the online system 140, in which each stage describes the viewing user's progress towards achieving objectives associated with a group of objects associated with the stage. In such embodiments, the grouping module 230 may access information stored in the action log 220 to determine the groups in which the objects should be included based on the viewing user's progress towards achieving the objectives. For example, stages within a progression of stages associated with objects corresponding to applications may include discovering the applications, considering installing the applications, and installing the applications. In this example, the grouping module 230 may access information stored in the action log 220 describing actions associated with the applications previously performed by the viewing user (e.g., viewing content associated with the applications, accessing a website at which the applications may be installed, installing the applications, etc.). Continuing with this example, based on the retrieved information, the grouping module 230 may determine in which of three groups each object should be included, in which each group is associated with a different stage. The functionality of the grouping module 230 is further described below in conjunction with FIG. 3.

Once the grouping module 230 has determined one or more groups in which each object included in a collection of objects associated with a third-party system 130 is included, information describing each group of objects may be stored in the group store 235. Information stored in the group store 235 describing a group of objects may include information identifying each object included in the group (e.g., a name or other identifier associated with the object and/or the third-party system 130 associated with the object), a condition associated with the group satisfied by each object included in the group, information identifying a viewing user of the online system 140 (e.g., an online system user identifier) associated with the condition associated with the group, a set of objectives associated with objects included in the group, etc. The group store 235 is further described below in conjunction with FIG. 3.

The format store 240 maintains multiple formats that may be used to present a group of objects within a user interface. Examples of formats include a grid format, a carousel format, a list format, or any other suitable types of formats having multiple positions in which objects may be presented. For example, nine objects included in a group may be presented using a 3×3 grid format having three rows and three columns, in which each of the objects may be presented in one of the nine positions of the grid format. As an additional example, a group of objects may be presented using a carousel format that is horizontally or vertically scrollable and each position of the carousel format may be used to present an object included in the group. In some embodiments, a carousel format may be scrolled automatically and/or manually in a forwards and/or a backwards direction and may or may not have a loop feature allowing an object presented in a first position and a last position of the carousel format to be viewed consecutively.

The format store 240 also may maintain multiple interface formats that may be used to present multiple groups of objects within a user interface. In various embodiments, interface formats may be the same as or similar to formats that may be used to present a group of objects (e.g., a grid format, a carousel format, a list format, etc.). For example, if a collection of objects associated with a third-party system 130 is organized into four groups, the groups may be presented within a user interface using a 2×2 grid format having two rows and two columns, in which each group may be presented in each of the four positions of the grid format. Similar to the formats that may be used to present a group of objects, in embodiments in which an interface format corresponds to a carousel format, the carousel format may be scrolled automatically and/or manually in a forwards and/or backwards direction and may or may not have a loop feature. The format store 240 is further described below in conjunction with FIG. 3.

The scoring module 245 computes (e.g., as shown in step 320 of FIG. 3) a format score associated with each of one or more formats maintained in the format store 240 that may be used to present a group of objects. A format score associated with a format indicates a predicted likelihood that a viewing user of the online system 140 will perform a set of actions corresponding to a set of objectives associated with a group of objects if the objects are presented using the format. The scoring module 245 may compute a format score associated with a format using a machine-learning model. In such embodiments, the scoring module 245 may provide an input to the model that includes information describing a set of formats maintained in the format store 240 that may be used to present a group of objects. The input provided to the model also may include a set of user-specific features associated with a viewing user of the online system 140 (e.g., a screen size of a client device 110 associated with the viewing user or format preferences specified by the viewing user retrieved from the user profile store 205 or information describing actions previously performed by the viewing user retrieved from the action log 220). The input provided to the model by the scoring module 245 also or alternatively may include a set of features associated with a group of objects (e.g., a number of objects included in the group, a condition satisfied by the objects included in the group, etc. retrieved from the group store 235). The scoring module 245 may then receive an output from the model corresponding to a format score associated with each format.

The scoring module 245 also may compute (e.g., as shown in step 330 of FIG. 3) an object score associated with an object that indicates a predicted likelihood that a viewing user of the online system 140 will perform an action corresponding to an objective associated with the object. For example, if an objective associated with an object corresponds to maximizing a number of clicks on the object, the scoring module 245 may compute an object score associated with the object that is proportional to a predicted likelihood that a viewing user of the online system 140 will click on the object. The scoring module 245 may compute an object score associated with an object based on historical information describing actions performed by a viewing user of the online system 140 or users of the online system 140 having at least a threshold measure of similarity to the viewing user in association with being presented with various objects (e.g., using a machine-learning model).

In some embodiments, the scoring module 245 also may compute (e.g., as shown in step 345 of FIG. 3) an interface format score associated with each of one or more interface formats maintained in the format store 240 that may be used to present multiple groups of objects. An interface format score associated with an interface format indicates a predicted likelihood that a viewing user of the online system 140 will perform a set of actions corresponding to a set of objectives associated with multiple groups of objects if the groups of objects are presented using the interface format. The scoring module 245 may compute an interface format score associated with an interface format using a machine-learning model. For example, the scoring module 245 may provide an input to a machine-learning model that includes information describing a set of interface formats that may be used to present multiple groups of objects, a set of user-specific features associated with a viewing user of the online system 140 and/or a set of features associated with the groups of objects. In this example, the scoring module 245 then receives an output from the model corresponding to an interface format score associated with each interface format.

In embodiments in which the scoring module 245 computes format scores, object scores, and/or interface format scores using a machine-learning model, the model may be trained using historical information maintained in the online system 140 (e.g., in the action log 220). The historical information may describe actions that were and were not performed by online system users in association with being presented with objects and/or groups of objects using various formats/interface formats, in which the actions correspond to objectives associated with the objects/groups of objects. The historical information also may include user-specific information associated with the users (e.g., a screen size of a client device 110 associated with each user, one or more format preferences specified by each user, etc. stored in the user profile store 205) and/or information associated with objects and/or groups of objects previously presented to the users (e.g., the number of objects included in the groups, the condition satisfied by objects included in the groups, etc. stored in the content store 210). The functionality of the scoring module 245 is further described below in conjunction with FIG. 3.

The rule store 250 may store a set of format selection rules that may be used to select a format for presenting a group of objects within a user interface. A format selection rule may be used to select a format for presenting a group of objects based on a set of conditions. For example, a format selection rule may specify that a grid format should be used for presenting a group of objects if the number of objects included in the group is equal to a number of positions of a grid format having between two and four rows and columns, in which the number of columns is greater than or equal to the number of rows. In this example, the format selection rule also may specify that a carousel format should be used in all other situations. In some embodiments, one or more format selection rules that may be used to select a format for presenting a group of objects associated with a third-party system 130 may be received from the third-party system 130.

The rule store 250 also may store a set of interface format selection rules that may be used to select an interface format for presenting multiple groups of objects within a user interface. An interface format selection rule may be used to select an interface format for presenting multiple groups of objects based on a set of conditions. For example, an interface format selection rule may specify that a grid format should be used for presenting groups of objects within a user interface if the number of groups is equal to a number of positions of a grid format having between two and five rows and columns, in which the number of rows is greater than or equal to the number of columns. In this example, the interface format selection rule also may specify that a carousel format should be used in all other situations. In some embodiments, one or more interface format selection rules that may be used to select an interface format for presenting multiple groups of objects associated with a third-party system 130 may be received from the third-party system 130.

The rule store 250 also may store a set of object ranking rules that may be used to rank objects included in a group of objects. An object ranking rule may be used to rank objects included in a group based on a set of conditions. For example, if a group of objects correspond to physical objects, such as products, an object ranking rule may be used to rank the objects if a viewing user of the online system 140 is within a threshold distance of a physical location (e.g., a retailer at which the products may be purchased). In this example, if the viewing user is within the threshold distance of the physical location, the object ranking rule may be used to rank the objects based on their availability at the physical location, such that objects corresponding to products that are in stock at the physical location are ranked higher than objects corresponding to products that are not in stock at the physical location. In some embodiments, one or more object ranking rules used to rank a group of objects associated with a third-party system 130 may be received from the third-party system 130.

The rule store 250 also may store a set of group ranking rules that may be used to rank multiple groups of objects. A group ranking rule may be used to rank multiple groups of objects based on a set of conditions. For example, if multiple groups of objects associated with a third-party system 130 includes a group of objects that were recently viewed by a viewing user of the online system 140, this group may be ranked the highest by default based on a group ranking rule. In this example, based on another group ranking rule, the remaining groups may be ranked based on an average of the object scores associated with the objects included in each group. In some embodiments, one or more group ranking rules used to rank multiple groups of objects associated with a third-party system 130 may be received from the third-party system 130. The rule store 250 is further described below in conjunction with FIG. 3.

The format selection module 255 selects (e.g., as shown in step 325 of FIG. 3) a format for presenting a group of objects within a user interface. In some embodiments, the format selection module 255 may select a format for presenting a group of objects based on a format score associated with each of multiple formats stored in the format store 240 that may be used to present the group of objects. For example, the format selection module 255 may access the format store 240, identify multiple formats that may be used to present a group of objects, and select a format associated with a highest format score for presenting the group of objects.

The format selection module 255 also or alternatively may select a format for presenting a group of objects within a user interface based on a set of format selection rules stored in the rule store 250. For example, suppose that a format selection rule specifies that a grid format should be used for presenting a group of objects within a user interface if the number of objects included in the group is equal to a number of positions of a grid format having between two and six rows and columns and that another format selection rule specifies that a carousel format should be used in all other situations. In this example, based on the format selection rules, the format selection module 255 may select a 3×3 grid format for presenting a group of nine objects within the user interface, but may select a carousel format for presenting a group of seven objects within the user interface. As an additional example, based on a format selection rule, the format selection module 255 may identify two types of carousel formats (e.g., a horizontally scrollable carousel format and a vertically scrollable carousel format) that may be used to present a group of objects within a user interface. In this example, the format selection module 255 may select the carousel format associated with the highest format score for presenting the group of objects within the user interface.

The format selection module 255 also may select (e.g., as shown in step 350 of FIG. 3) an interface format for presenting multiple groups of objects within a user interface. The format selection module 255 may select an interface format for presenting multiple groups of objects based on an interface format score associated with each of multiple interface formats stored in the format store 240 that may be used to present the groups of objects. For example, the format selection module 255 may access the format store 240, identify multiple interface formats that may be used to present multiple groups of objects and select an interface format associated with a highest interface format score for presenting the groups of objects.

The format selection module 255 also or alternatively may select an interface format for presenting multiple groups of objects within a user interface based on a set of interface format selection rules stored in the rule store 250. For example, suppose that an interface format selection rule specifies that a grid format should be used for presenting multiple groups of objects within a user interface if the number of groups is equal to a number of positions of a grid format having between two and seven rows and columns and that another interface format selection rule specifies that a carousel format should be used in all other situations. In this example, based on the interface format selection rules, the format selection module 255 may select a 4×4 grid format for presenting 16 groups of objects within the user interface, but may select a carousel format for presenting 11 groups of objects within the user interface. As an additional example, based on an interface format selection rule, the format selection module 255 may identify two types of grid formats (e.g., a 4×3 grid format and a 3×4 grid format) that may be used to present 12 groups of objects within a user interface. In this example, the format selection module 255 may select the grid format associated with a highest interface format score for presenting the groups of objects within the user interface. The functionality of the format selection module 255 is further described below in conjunction with FIG. 3.

The ranking module 260 may rank (e.g., as shown in step 335 of FIG. 3) a group of objects. In some embodiments, the ranking module 260 may rank a group of objects based on an object score associated with each object. For example, once the scoring module 245 has computed an object score associated with each object included in a group of objects, the ranking module 260 may rank the objects based on their associated object scores, such that objects that are associated with higher object scores are ranked higher than objects that are associated with lower object scores.

The ranking module 260 also or alternatively may rank a group of objects based on a set of object ranking rules stored in the rule store 250. For example, if a group of objects correspond to physical objects, such as products, the ranking module 260 may rank the objects based on a set of object ranking rules and on an availability of the products at a retailer at which the products may be purchased if a viewing user of the online system 140 is within a threshold distance of the retailer. In this example, the objects also may be ranked based on an object score associated with each object, such that objects corresponding to products that are in stock at the retailer and that are associated with higher object scores are ranked higher than objects corresponding to products that are in stock and that are associated with lower object scores. Similarly, in the above example, objects corresponding to products that are out of stock and that are associated with higher object scores are ranked higher than objects corresponding to products that are out of stock and that are associated with lower object scores.

The ranking module 260 also may rank (e.g., as shown in step 340 of FIG. 3) multiple groups of objects. The ranking module 260 may do so based on a set of object scores associated with a set of objects included in each group. In various embodiments, the ranking module 260 may compute a sum or an average of the object scores associated with objects included in each group and rank the groups based on the averages/sums. For example, the ranking module 260 may compute an average of a set of object scores associated with a first group of objects and an average of a set of object scores associated with a second group of objects. In this example, if the average of the object scores associated with the first group is higher than the average of the object scores associated with the second group, the first group is ranked higher than the second group. As an additional example, the ranking module 260 may compute a sum of a set of object scores associated with a first group of objects and a sum of a set of object scores associated with a second group of objects. In this example, if the sum of the object scores associated with the first group of objects is higher than the sum of the object scores associated with the second group of objects, the first group of objects is ranked higher than the second group of objects. In various embodiments, the ranking module 260 also may rank multiple groups of objects based on a highest object score associated with each group of objects. For example, if a highest object score associated with an object included in a first group of objects is higher than a highest object score associated with an object included in a second group of objects, the first group of objects is ranked higher than the second group of objects.

The ranking module 260 also or alternatively may rank multiple groups of objects based on a set of group ranking rules. For example, if a group of objects that are most frequently viewed by a viewing user of the online system 140 is included among multiple groups of objects, the ranking module 260 may rank the group of objects that are most frequently viewed by the viewing user the highest by default based on a group ranking rule. In this example, based on another group ranking rule, the ranking module 260 may rank the remaining groups based on a sum of the object scores associated with objects included in the groups. The functionality of the ranking module 260 is further described below in conjunction with FIG. 3.

The user interface generator 265 generates (e.g., as shown in step 355 of FIG. 3) a user interface for presenting one or more groups of objects. In various embodiments, the user interface may correspond to a landing page for a website associated with a third-party system 130. For example, the user interface may correspond to a landing page for a website associated with a third-party system 130 that is accessed by a viewing user of the online system 140 via a link included in a content item associated with the third-party system 130, in which the content item is presented to the viewing user by the online system 140. In some embodiments, the user interface may include one or more interactive elements (e.g., buttons, scroll bars, etc.) that allow a viewing user of the online system 140 to interact with the group(s) of objects.

In some embodiments, once the format selection module 255 has selected a format for presenting a group of objects within a user interface, the user interface generator 265 generates the user interface based on the selected format. For example, suppose that the format selection module 255 has selected a 3×3 grid format for presenting a group of nine objects that were recently viewed by a viewing user of the online system 140. In this example, the user interface generator 265 may generate a user interface that presents each of the nine objects that were recently viewed by the viewing user in one of the nine positions of the 3×3 grid format.

In some embodiments, the user interface generator 265 determines a placement of each object included in a group of objects in a position of a format selected for presenting the group of objects based on a ranking of the objects and on a prominence of each of the positions of the selected format and generates the user interface based on the determination. For example, suppose that the format selection module 255 has selected a carousel format for presenting a group of objects and the ranking module 260 has ranked each object based on a set of object scores associated with the objects and/or a set of object ranking rules. In this example, the user interface generator 265 may determine that the highest ranked object included in the group of objects should be placed in the most prominent position of the carousel format, that a second-highest ranked object included in the group of objects should be placed in a second-most prominent position of the carousel format, etc. Continuing with this example, the user interface generator 265 may then generate the user interface, in which the objects are presented in the positions of the carousel format determined by the user interface generator 265.

In some embodiments, once the format selection module 255 has selected an interface format for presenting multiple groups of objects within a user interface, the user interface generator 265 generates the user interface based on the selected interface format. For example, if the format selection module 255 has selected a 3×3 grid format for presenting nine groups of objects, the user interface generator 265 may generate a user interface that presents each of the nine groups in one of the nine positions of the 3×3 grid format. As an additional example, if the format selection module 255 has selected a vertically scrollable carousel format for presenting seven groups of objects, the user interface generator 265 may generate a user interface that presents each of the seven groups in one of the seven positions of the vertically scrollable carousel format.

In some embodiments, the user interface generator 265 determines a placement of each of multiple groups in a position of an interface format selected for presenting multiple groups of objects based on a ranking of the groups and on a prominence of each of the positions of the selected interface format and generates the user interface based on the determination. For example, suppose that the format selection module 255 has selected a grid format for presenting multiple groups of objects within the user interface and the ranking module 260 has ranked each group of objects based on sets of object scores associated with the groups of objects and/or a set of group ranking rules. In this example, the user interface generator 265 may determine that the highest ranked group of objects should be placed in the most prominent position of the grid format, that a second-highest ranked group of objects should be placed in a second-most prominent position of the grid format, etc. Continuing with this example, the user interface generator 265 may then generate the user interface, in which the groups of objects are presented in positions of the grid format determined by the user interface generator 265.

In some embodiments, each group of objects may be presented in the user interface generated by the user interface generator 265 in conjunction with a title or a name that describes the group of objects to a viewing user of the online system 140. For example, a group of objects may be presented in the user interface in conjunction with a title such as "Recommended for you," "Recently viewed," "Trending now," and "Because of your interest in . . . " The functionality of the user interface generator 265 is further described below in conjunction with FIGS. 3, 4A, 4B, 5A, and 5B.

The web server 270 links the online system 140 via the network 120 to the one or more client devices 110, as well as to the one or more third-party systems 130. The web server 270 serves web pages, as well as other content, such as JAVA®, FLASH®, XML, and so forth. The web server 270 may receive and route messages between the online system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 210. Additionally, the web server 270 may provide application programming interface (API) functionality to send data directly to native client device operating systems, such as IOS®, ANDROID™, WEBOS® or BlackberryOS.

Figure 3:
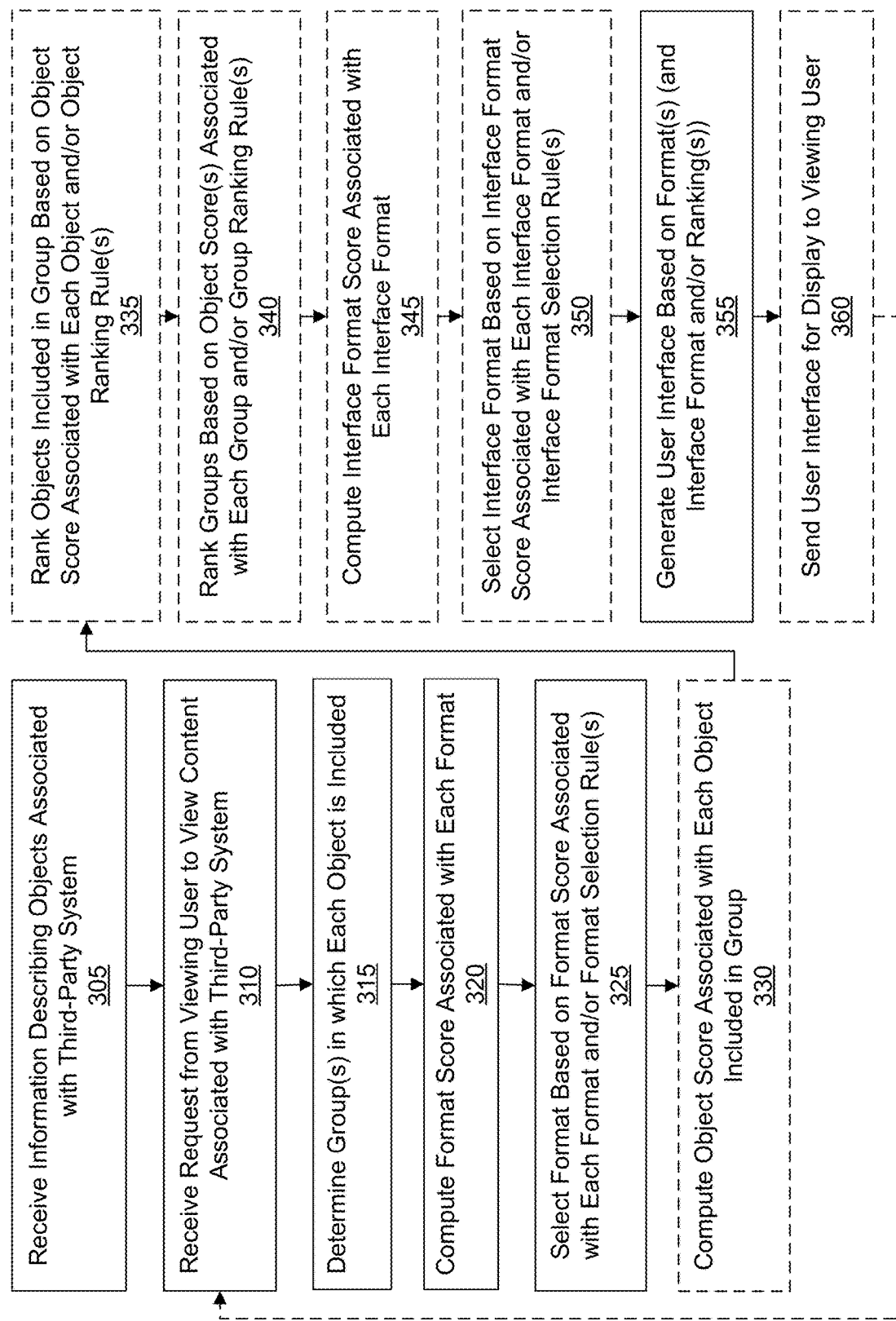
FIG. 3 is a flow chart of a method for selecting an optimal format for presenting a group of objects associated with a third-party system, in accordance with an embodiment.

Selecting an Optimal Format for Presenting a Group of Objects Associated with a Third-Party System FIG. 3 is a flow chart of a method for selecting an optimal format for presenting a group of objects associated with a third-party system. In other embodiments, the method may include different and/or additional steps than those shown in FIG. 3. Additionally, steps of the method may be performed in a different order than the order described in conjunction with FIG. 3.

The online system 140 receives 305 information describing a collection of objects associated with a third-party system 130. The online system 140 may receive 305 the information from the third-party system 130 or an entity associated with the third-party system 130. As described above, in some embodiments, the objects may correspond to physical objects (e.g., products), applications (e.g., gaming applications, mobile applications, etc.), services, events, content items, etc. As also described above, in embodiments in which the objects correspond to content items, the content items may include various types of content associated with the third-party system 130 (e.g., content generated by an online system user, a promotion, a chat feature, editorial content, information describing the third-party system 130, a request to provide information associated with the third-party system 130, a request to receive information associated with the third-party system 130, etc.). The online system 140 may receive 305 the information in association with an objective associated with each object (e.g., maximizing a number of clicks on the object, maximizing a number of conversions associated with the object, etc.). In various embodiments, upon receiving 305 the information describing the collection of objects, the online system 140 may store the information (e.g., in the content store 210).

The online system 140 then receives 310 a request from a viewing user of the online system 140 to view content associated with the third-party system 130. In various embodiments, the request may correspond to a request to access a landing page for a website associated with the third-party system 130. For example, the online system 140 may receive 310 a request from the viewing user to access a landing page for a website associated with the third-party system 130 via a link included in a content item associated with the third-party system 130 that is presented to the viewing user (e.g., in a newsfeed via a user profile page associated with the viewing user). In some embodiments, the request may include various types of information associated with the viewing user, such as information identifying the viewing user (e.g., a username associated with the viewing user in the online system 140), information describing a location associated with the viewing user, information describing a type of client device 110 being used by the viewing user to access the online system 140, etc.

The online system 140 determines 315 (e.g., using the grouping module 230) one or more groups in which each object included in the collection of objects is included based on a condition satisfied by objects included in each group. Examples of conditions satisfied by groups of objects include being recently viewed by the viewing user, being similar to one or more objects recently viewed by the viewing user, being of interest or likely being of interest to users of the online system 140 connected to the viewing user, being of interest or likely being of interest to the viewing user, being popular on a local level, being popular on a global level, etc. In various embodiments, groups of objects may be associated with different stages within a progression of stages capable of being satisfied by the viewing user, in which each stage describes the viewing user's progress towards achieving objectives associated with objects included in a group of objects associated with the stage. In such embodiments, the online system 140 may access information stored in the online system 140 (e.g., in the action log 220) describing the viewing user's progress towards achieving the objectives to determine 315 the groups in which the objects should be included. In some embodiments, the online system 140 may determine 315 that an object should be included in multiple groups. In various embodiments, once the online system 140 has determined 315 one or more groups in which each object included in the collection of objects is included, information describing each group of objects is stored (e.g., in the group store 235).

Once the online system 140 has determined 315 one or more groups in which each object is included, the online system 140 computes 320 (e.g., using the scoring module 245) a format score associated with each of one or more formats maintained in the online system 140 (e.g., in the format store 240) that may be used to present each group of objects within a user interface. As described above, a format score associated with a format indicates a predicted likelihood that the viewing user will perform a set of actions corresponding to a set of objectives associated with a group of objects if the objects are presented using the format. As also described above, in some embodiments, the online system 140 may compute 320 a format score associated with a format using a machine-learning model. In such embodiments, the online system 140 may provide an input including information describing a set of formats that may be used to present a group of objects, a set of user-specific features associated with the viewing user, and/or a set of features associated with the group of objects and receive an output from the model corresponding to a format score associated with each format.

The online system 140 then selects 325 (e.g., using the format selection module 255) a format for presenting each group of objects. In some embodiments, the online system 140 may select 325 a format for presenting a group of objects based on a format score associated with each of multiple formats that may be used to present the group of objects (e.g., by selecting 325 a format associated with a highest format score). The online system 140 also or alternatively may select 325 a format for presenting a group of objects based on a set of format selection rules stored in the online system 140 (e.g., in the rule store 250). As described above, a format selection rule may be used to select 325 a format for presenting a group of objects within a user interface based on a set of conditions (e.g., if the number of objects included in the group is equal to a number of positions of a grid format, etc.).

In some embodiments, the online system 140 may compute 330 (e.g., using the scoring module 245) an object score associated with an object included among the collection of objects that indicates a predicted likelihood that the viewing user will perform an action corresponding to an objective associated with the object. The online system 140 may compute 330 an object score associated with an object based on historical information describing actions associated with the same or similar objects performed by the viewing user or users of the online system 140 having at least a threshold measure of similarity to the viewing user. In such embodiments, the object score may be computed 330 using a machine-learning model.

The online system 140 may then rank 335 (e.g., using the ranking module 260) each group of objects. In some embodiments, the online system 140 may rank 335 a group of objects based on an object score associated with each object (e.g., by ranking (in step 335) objects that are associated with higher object scores higher than objects that are associated with lower object scores). The online system 140 also or alternatively may rank 335 a group of objects based on a set of object ranking rules stored in the online system 140 (e.g., in the rule store 250). As described above, an object ranking rule may be used to rank 335 a group of objects based on a set of conditions (e.g., based on an availability of products corresponding to the objects at a retailer if the viewing user is within a threshold distance of the retailer).

In embodiments in which the online system 140 has determined 315 that the collection of objects associated with the third-party system 130 should be organized into multiple groups of objects, the online system 140 also may rank 340 (e.g., using the ranking module 260) the groups of objects. In such embodiments, the online system 140 may rank 340 the groups of objects based on a set of object scores associated with each group of objects (e.g., based on a highest object score associated with each group of objects or based on an average or a sum of the object scores associated with each group of objects). As described above, the online system 140 also or alternatively may rank (in step 340) the groups of objects based on a set of group ranking rules (e.g., group ranking rules that rank 340 multiple groups of objects based on conditions satisfied by objects included in each group).

In embodiments in which the collection of objects associated with the third-party system 130 is organized into multiple groups of objects, the online system 140 also may compute 345 (e.g., using the scoring module 245) an interface format score associated with each of one or more interface formats maintained in the online system 140 (e.g., in the format store 240) that may be used to present the groups of objects. As described above, an interface format score associated with an interface format indicates a predicted likelihood that the viewing user will perform a set of actions corresponding to a set of objectives associated with multiple groups of objects if the groups of objects are presented using the interface format. As also described above, in some embodiments, the online system 140 may compute 345 an interface format score associated with an interface format using a machine-learning model.

In embodiments in which the collection of objects associated with the third-party system 130 is organized into multiple groups of objects, the online system 140 may then select 350 (e.g., using the format selection module 255) an interface format for presenting the groups of objects within a user interface. In such embodiments, the online system 140 may select 350 an interface format based on an interface format score associated with each interface format that may be used to present the groups of objects (e.g., by selecting 350 an interface format associated with a highest interface format score for presenting the groups of objects). The online system 140 also or alternatively may select 350 an interface format based on a set of interface format selection rules stored in the online system 140 (e.g., in the rule store 250). As described above, an interface format selection rule may be used to select 350 an interface format for presenting multiple groups of objects within a user interface based on a set of conditions (e.g., if the number of groups is equal to a number of positions of a grid format, etc.).

The online system 140 generates 355 (e.g., using the user interface generator 265) a user interface for presenting the collection of objects associated with the third-party system 130. As described above, the user interface may correspond to a landing page for a website associated with the third-party system 130 that may be accessed by the viewing user via a link. In some embodiments, once the online system 140 has selected 325 a format for presenting each group of objects into which the collection of objects is organized, the online system 140 generates 355 the user interface based on the selected format(s). In various embodiments, each group of objects may be presented in the user interface in conjunction with a title or a name that describes the group of objects to the viewing user (e.g., "Recommended for you," "Recently viewed," "Trending now," and "Because of your interest in . . . "). In some embodiments, the user interface may include one or more interactive elements (e.g., buttons, scroll bars, etc.) that allow a viewing user of the online system 140 to interact with the group(s) of objects.

Figure 4A:
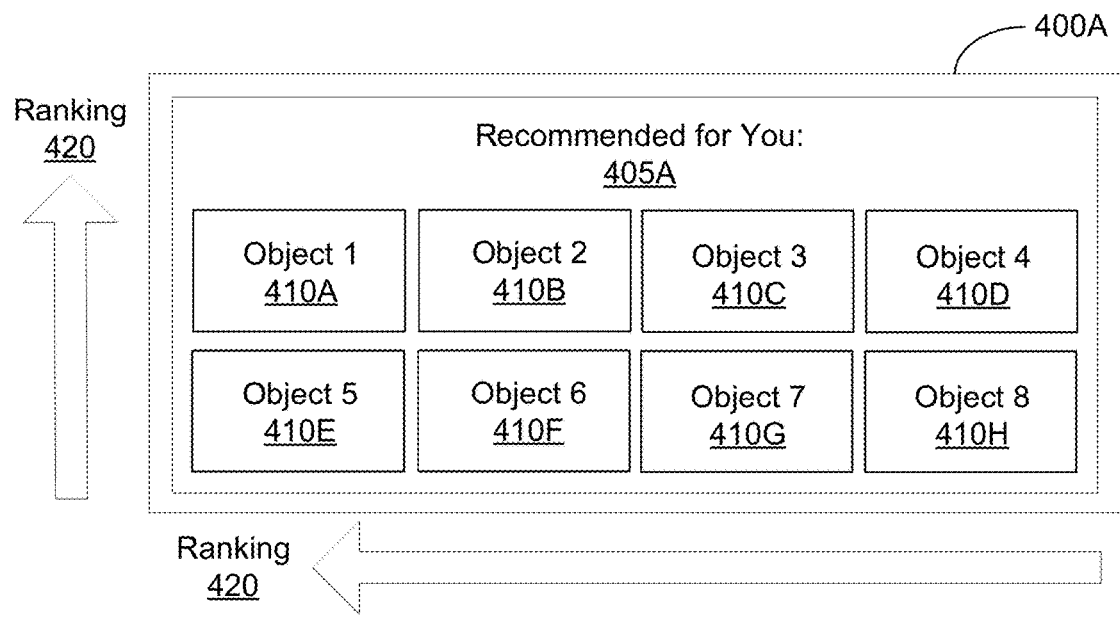
FIG. 4A is an example of a format for presenting a group of objects associated with a third-party system, in accordance with an embodiment.

The online system 140 may determine a placement of each object included in a group of objects in a position of a format selected 325 for presenting the group of objects based on a ranking of the objects and on a prominence of each of the positions of the selected format and generate 355 the user interface based on the determination. As shown in the example of FIG. 4A, suppose that the online system 140 has selected 325 a 4×2 grid format for presenting a group of objects 405A being recommended to the viewing user and that the online system 140 has ranked 335 each object 410A-H based on a set of object scores associated with the objects 410A-H and/or a set of object ranking rules. In this example, suppose also that a first row of positions of the grid format are more prominent than a second row of positions of the grid format and that positions on the left side of each row of the grid format are more prominent than positions on the right side of each row of the grid format. Continuing with this example, the online system 140 may determine a position of each object 410A-H based on the ranking 420 and on the prominence of the positions, such that the online system 140 determines that the highest ranked object (Object 1 410A) should be placed in the most prominent position of the grid format (a left-most position in the first row of positions), that a second-highest ranked object (Object 2 410B) should be placed in a second-most prominent position of the grid format (a second left-most position in the first row of positions), etc. In this example, the online system 140 may then generate 355 the user interface 400A, in which the objects 410A-H are presented in the positions of the grid format determined by the online system 140.

Figure 4B:
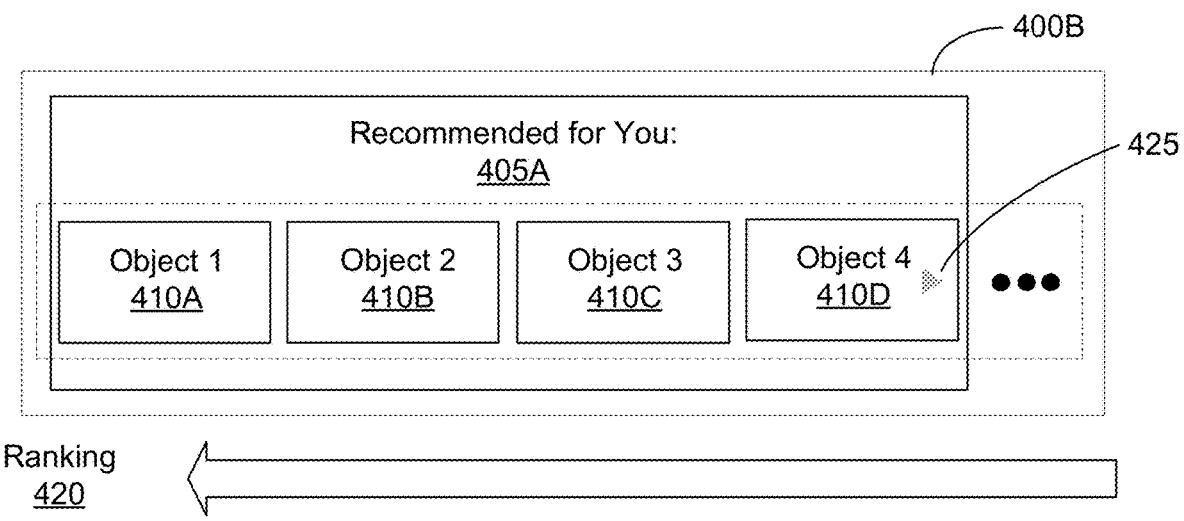
FIG. 4B is an additional example of a format for presenting a group of objects associated with a third-party system, in accordance with an embodiment.

Alternatively, as shown in the example of FIG. 4B, suppose that the online system 140 had instead selected 325 a horizontally scrollable carousel format for presenting the group of objects 405A being recommended to the viewing user and that positions on the left side of the carousel format are more prominent than positions on the right side of the carousel format. In this example, the online system 140 may determine a position of each object 410A-H based on the ranking 420 and on the prominence of the positions, such that the online system 140 determines that the highest ranked object (Object 1 410A) should be placed in the most prominent position of the carousel format (a left-most position), that a second-highest ranked object (Object 2 410B) should be placed in a second-most prominent position of the grid format (a second left-most position), etc. Continuing with this example, the online system 140 may then generate 355 the user interface 400B, in which the highest ranked objects (Object 1 410A-Object 4 410D) are presented in the most prominent positions of the carousel format and the four lowest ranked objects (Object 5 410E-Object 8 410H) are presented in the least prominent positions of the carousel format, such that the viewing user must scroll past the highest ranked objects in order to view the lowest ranked objects (e.g., using a button 425 or a scroll bar).

In embodiments in which the online system 140 has determined 315 that the collection of objects associated with the third-party system 130 should be organized into multiple groups of objects, once the online system 140 has selected 350 an interface format for presenting the groups of objects, the online system 140 may generate 355 the user interface based on the selected interface format. In such embodiments, the online system 140 may determine a placement of each group of objects in each position of the selected interface format based on a ranking of the groups and on a prominence of each of the positions of the interface format and generate 355 the user interface based on the determination.

Figure 5A:
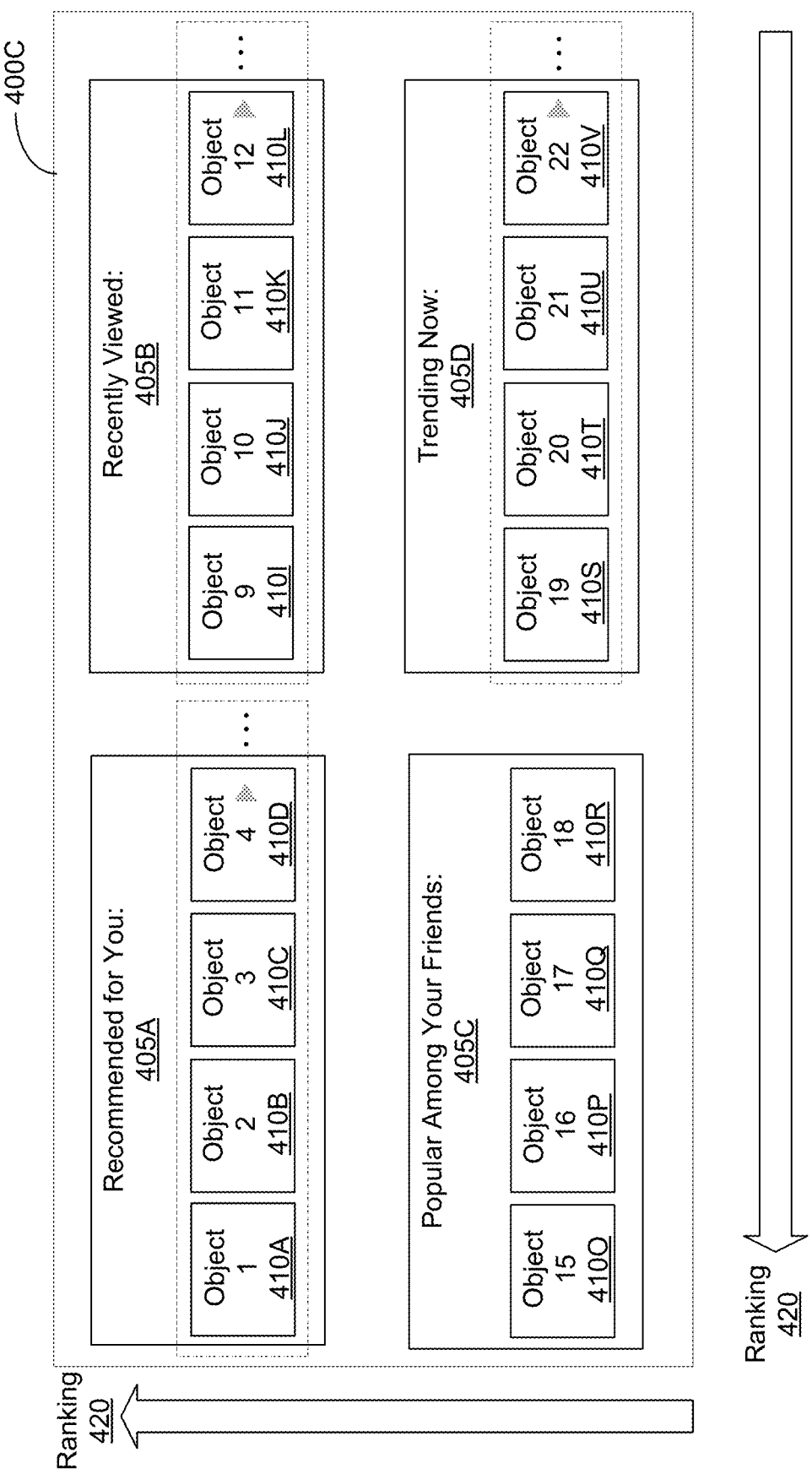
FIG. 5A is an example of a format for presenting multiple groups of objects associated with a third-party system, in accordance with an embodiment.

As shown in the example of FIG. 5A, suppose that the online system 140 has selected 350 a 2×2 grid format for presenting groups of objects 405A-D associated with the third-party system 130, in which each group of objects 405A-D is being presented using a horizontally-scrollable carousel format. In this example, suppose also that the online system 140 has ranked 340 each group of objects 405A-D and that a first row of positions of the grid format are more prominent than a second row of positions of the grid format and that positions on the left side of each row of the grid format are more prominent than positions on the right side of each row of the grid format. Continuing with this example, the online system 140 may determine a position of each group of objects 405A-D based on the ranking 420 and on the prominence of the positions, such that the online system 140 determines that the highest ranked group of objects 405A should be placed in the most prominent position of the grid format (a left-most position in the first row of positions), that a second-highest ranked group of objects 405B should be placed in a second-most prominent position of the grid format (a second left-most position in the first row of positions), etc. In this example, the online system 140 may then generate 355 the user interface 400C, in which the groups of objects 405A-D are presented in the positions of the grid format determined by the online system 140.

Figure 5B:
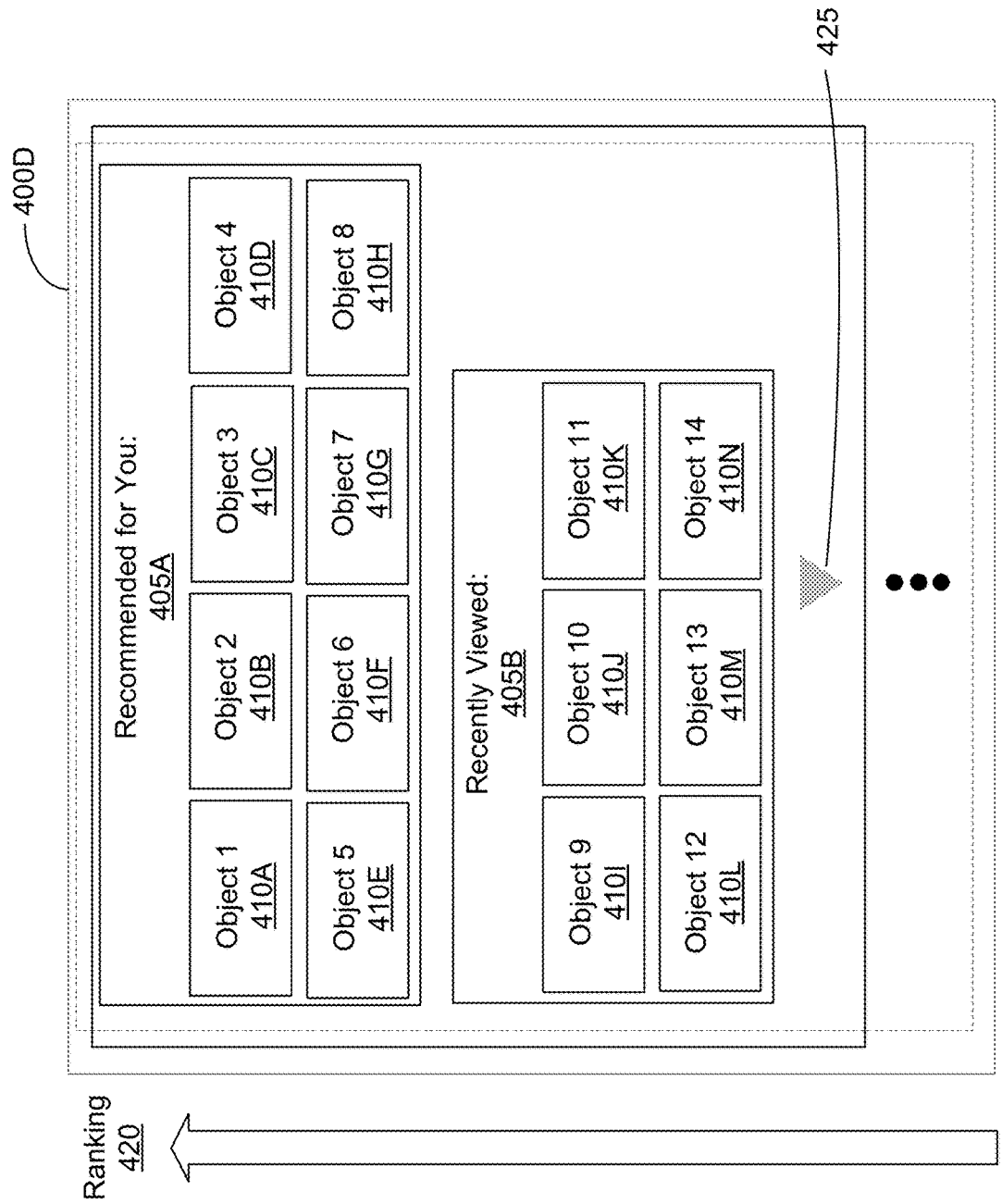
FIG. 5B is an additional example of a format for presenting multiple groups of objects associated with a third-party system, in accordance with an embodiment.

Alternatively, as shown in the example of FIG. 5B, suppose that the online system 140 had instead selected 350 a vertically scrollable carousel format for presenting the groups of objects 405A-D associated with the third-party system 130, in which each group of objects 405A-D is being presented using a grid format. In this example, suppose that each position of the vertically scrollable carousel format is more prominent than other positions below it. Continuing with this example, the online system 140 may determine a position of each group of objects 405A-D based on the ranking 420 and on the prominence of the positions, such that the online system 140 determines that the highest ranked group of objects 405A should be placed in the most prominent position of the vertically scrollable carousel format (a highest position), that a second-highest ranked group of objects 405B should be placed in a second-most prominent position of the vertically scrollable carousel format (a second highest position), etc. In this example, the online system 140 may then generate 355 the user interface 400D, in which the groups of objects 405A-D are presented in the positions of the vertically scrollable carousel format determined by the online system 140, such that the viewing user must scroll past the highest ranked groups of objects 405A-B in order to view the lowest ranked groups of objects 405C-D (e.g., using a button 425 or a scroll bar).

Referring back to FIG. 3, once the online system 140 has generated 355 the user interface, the online system 140 may send 360 the user interface for display to the viewing user. For example, the online system 140 may send 360 the user interface to a client device 110 associated with the viewing user, which then displays the user interface in a display area of the client device 110. In some embodiments, the online system 140 may repeat some of the steps described above (e.g., by proceeding back to the receiving 310 a request from a viewing user of the online system 140 to view content associated with the third-party system 130 step, etc.).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, information describing a plurality of objects associated with a third-party system, each of the plurality of objects associated with an objective;
   receiving a request from a viewing user of the online system to view content associated with the third-party system;
   determining one or more groups in which each of the plurality of objects is included based at least in part on a condition satisfied by one or more objects included in each group, wherein the condition satisfied by the one or more objects included in each group is selected from the group consisting of: being viewed by the viewing user within a threshold amount of time of a current time, having at least a threshold measure of similarity to an object viewed by the viewing user within the threshold amount of time of the current time, having at least a threshold number of online system users located within a threshold distance of a geographic location associated with the viewing user express an interest in the one or more objects, having at least a threshold number of online system users connected to the viewing user in the online system express an interest in the one or more objects, being associated with at least a threshold predicted likelihood that the viewing user will express an interest in the one or more objects, and being associated with a stage within a progression of stages capable of being satisfied by the viewing user;
   computing a format score associated with each of a plurality of formats, the format score associated with a format indicating a predicted likelihood that the viewing user will perform a set of actions corresponding to a set of objectives associated with a set of objects included in a group of the one or more groups if the set of objects is presented using the format;
   selecting a format for presenting the set of objects included in the group based at least in part on one or more of: the format score associated with each of the plurality of formats and a set of format selection rules; and
   generating a user interface for presenting the plurality of objects based at least in part on the selected format.

2. The method of claim 1, wherein the format score associated with each of the plurality of formats is computed based at least in part on one or more of: a set of user features associated with the viewing user and a set of object features associated with the set of objects included in the group, the set of user features comprising one or more of: a size of a display area of a client device associated with the viewing user and one or more format preferences specified by the viewing user, the set of object features comprising one or more of: a number of objects included in the group and the condition satisfied by the set of objects included in the group.

3. The method of claim 1, wherein the plurality of objects represent one or more of: a physical object, an application, a service, an event, and a content item, wherein the content item includes one or more of: information describing the third-party system, content associated with the third-party system generated by a user of the online system, a promotion associated with the third-party system, a request to provide information to the third-party system, a request for information associated with the third-party system, a chat feature associated with the third-party system, and editorial content associated with the third-party system.

4. The method of claim 1, further comprising:
   computing an object score associated with each of the set of objects included in the group, the object score associated with an object indicating a predicted likelihood that the viewing user will perform an action corresponding to the objective associated with the object;
   ranking the set of objects included in the group based at least in part on one or more of: the object score associated with each of the set of objects included in the group and a set of object ranking rules;
   ranking the one or more groups based at least in part on one or more of: a set of object scores associated with the group and a set of group ranking rules;
   computing an interface format score associated with each of the plurality of formats, the interface format score indicating a predicted likelihood that the viewing user will perform a set of actions corresponding to a set of objectives associated with the one or more objects included in each group if the one or more groups are presented using a format;
   selecting an interface format for presenting the one or more groups based at least in part on one or more of: the interface format score associated with each of the plurality of formats and a set of interface format selection rules; and
   sending the user interface for display to the viewing user.

5. The method of claim 4, wherein generating the user interface for presenting the plurality of objects comprises:
   determining a placement of each of the set of objects included in the group in each of a set of positions of the selected format, the placement determined based at least in part on the ranking of the set of objects included in the group and a prominence of each of the set of positions of the selected format;
   determining an additional placement of each of the one or more groups in each of a set of additional positions of the selected interface format, the additional placement determined based at least in part on the ranking of the one or more groups and a prominence of each of the set of additional positions of the selected interface format; and
   generating the user interface based at least in part on the determined placement and the determined additional placement.

6. The method of claim 4, wherein ranking the set of objects included in the group based at least in part on the set of object ranking rules comprises:
   ranking a subset of objects included in a group higher than an additional subset of objects included in the group if the viewing user is within a threshold distance of a physical location associated with the third-party system, wherein the subset of objects is associated with the physical location and the additional subset of objects is not associated with the physical location.

7. The method of claim 4, wherein ranking the one or more groups comprises:
computing one or more of: a sum of the set of object scores associated with the group and an average of the set of object scores associated with the group; and
ranking the one or more groups based at least in part on the one or more of: the sum of the set of object scores associated with the group and the average of the set of object scores associated with the group.

8. The method of claim 1, wherein the plurality of formats comprises a grid format and a carousel format.

9. The method of claim 1, wherein the objective associated with each of the plurality of objects corresponds to maximizing a number of clicks on the object or maximizing a number of conversions associated with the object.

10. A computer program product comprising a non-transitory computer readable storage medium having instructions encoded thereon that, when executed by a processor, cause the processor to:
receive, at an online system, information describing a plurality of objects associated with a third-party system, each of the plurality of objects associated with an objective;
receive a request from a viewing user of the online system to view content associated with the third-party system;
determine one or more groups in which each of the plurality of objects is included based at least in part on a condition satisfied by one or more objects included in each group, wherein the condition satisfied by the one or more objects included in each group is selected from the group consisting of: being viewed by the viewing user within a threshold amount of time of a current time, having at least a threshold measure of similarity to an object viewed by the viewing user within the threshold amount of time of the current time, having at least a threshold number of online system users located within a threshold distance of a geographic location associated with the viewing user express an interest in the one or more objects, having at least a threshold number of online system users connected to the viewing user in the online system express an interest in the one or more objects, being associated with at least a threshold predicted likelihood that the viewing user will express an interest in the one or more objects, and being associated with a stage within a progression of stages capable of being satisfied by the viewing user;
compute a format score associated with each of a plurality of formats, the format score associated with a format indicating a predicted likelihood that the viewing user will perform a set of actions corresponding to a set of objectives associated with a set of objects included in a group of the one or more groups if the set of objects is presented using the format;
select a format for presenting the set of objects included in the group based at least in part on one or more of: the format score associated with each of the plurality of formats and a set of format selection rules; and
generate a user interface for presenting the plurality of objects based at least in part on the selected format.

11. The computer program product of claim 10, wherein the format score associated with each of the plurality of formats is computed based at least in part on one or more of: a set of user features associated with the viewing user and a set of object features associated with the set of objects included in the group, the set of user features comprising one or more of: a size of a display area of a client device associated with the viewing user and one or more format preferences specified by the viewing user, the set of object features comprising one or more of: a number of objects included in the group and the condition satisfied by the set of objects included in the group.

12. The computer program product of claim 10, wherein the plurality of objects represent one or more of: a physical object, an application, a service, an event, and a content item, wherein the content item includes one or more of: information describing the third-party system, content associated with the third-party system generated by a user of the online system, a promotion associated with the third-party system, a request to provide information to the third-party system, a request for information associated with the third-party system, a chat feature associated with the third-party system, and editorial content associated with the third-party system.

13. The computer program product of claim 10, wherein the computer readable storage medium further has instructions encoded thereon that, when executed by the processor, cause the processor to:
compute an object score associated with each of the set of objects included in the group, the object score associated with an object indicating a predicted likelihood that the viewing user will perform an action corresponding to the objective associated with the object;
rank the set of objects included in the group based at least in part on one or more of: the object score associated with each of the set of objects included in the group and a set of object ranking rules;
rank the one or more groups based at least in part on one or more of: a set of object scores associated with the group and a set of group ranking rules;
compute an interface format score associated with each of the plurality of formats, the interface format score indicating a predicted likelihood that the viewing user will perform a set of actions corresponding to a set of objectives associated with the one or more objects included in each group if the one or more groups are presented using a format;
select an interface format for presenting the one or more groups based at least in part on one or more of: the interface format score associated with each of the plurality of formats and a set of interface format selection rules; and
send the user interface for display to the viewing user.

14. The computer program product of claim 13, wherein generate the user interface for presenting the plurality of objects comprises:
determine a placement of each of the set of objects included in the group in each of a set of positions of the selected format, the placement determined based at least in part on the ranking of the set of objects included in the group and a prominence of each of the set of positions of the selected format;
determine an additional placement of each of the one or more groups in each of a set of additional positions of the selected interface format, the additional placement determined based at least in part on the ranking of the one or more groups and a prominence of each of the set of additional positions of the selected interface format; and
generate the user interface based at least in part on the determined placement and the determined additional placement.

15. The computer program product of claim 13, wherein rank the set of objects included in the group based at least in part on the set of object ranking rules comprises:
    rank a subset of objects included in a group higher than an additional subset of objects included in the group if the viewing user is within a threshold distance of a physical location associated with the third-party system, wherein the subset of objects is associated with the physical location and the additional subset of objects is not associated with the physical location.

16. The computer program product of claim 13, wherein rank the one or more groups comprises:
    compute one or more of: a sum of the set of object scores associated with the group and an average of the set of object scores associated with the group; and
    rank the one or more groups based at least in part on the one or more of: the sum of the set of object scores associated with the group and the average of the set of object scores associated with the group.

17. The computer program product of claim 10, wherein the plurality of formats comprises a grid format and a carousel format.

18. The computer program product of claim 10, wherein the objective associated with each of the plurality of objects corresponds to maximizing a number of clicks on the object or maximizing a number of conversions associated with the object.

\* \* \* \* \*